(12) United States Patent
Ball et al.

(10) Patent No.: US 11,886,873 B2
(45) Date of Patent: Jan. 30, 2024

(54) SOFTWARE PRODUCT UPGRADE WITH TRANSPARENT DATA MIGRATION

(71) Applicant: Microsoft Technology Licensing, LLC, Redmond, WA (US)

(72) Inventors: Steven J. Ball, Redmond, WA (US); Maya Neelakandhan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 17/825,328

(22) Filed: May 26, 2022

(65) Prior Publication Data

US 2023/0385058 A1   Nov. 30, 2023

(51) Int. Cl.
*G06F 8/76* (2018.01)
*G06F 8/65* (2018.01)

(52) U.S. Cl.
CPC . *G06F 8/76* (2013.01); *G06F 8/65* (2013.01)

(58) Field of Classification Search
None
See application file for complete search history.

(56) References Cited

U.S. PATENT DOCUMENTS

| | | | | |
|---|---|---|---|---|
| 7,155,462 B1 * | 12/2006 | Singh | ........................ | G06F 8/65 |
| | | | | 707/999.203 |
| 10,430,180 B2 * | 10/2019 | Kakhandiki | ............ | G06F 8/658 |
| 2010/0088281 A1 * | 4/2010 | Driesen | ............... | G06F 11/1433 |
| | | | | 707/E17.007 |
| 2011/0321025 A1 * | 12/2011 | Challa | ........................ | G06F 8/65 |
| | | | | 717/169 |
| 2017/0177649 A1 * | 6/2017 | Badrinarayanan | ...... | G06F 21/64 |
| 2017/0322794 A1 * | 11/2017 | Ferlitsch | ................. | H04L 67/01 |
| 2022/0103427 A1 * | 3/2022 | Mallipudi | ............. | H04L 41/082 |

OTHER PUBLICATIONS

Martens, "A Data Decomposition Method for Stepwise Migration of Complex Legacy Data", 2018, ACM/IEEE (Year: 2018).*
Velimeneti, "Data Migration from Legacy Systems to Modern Database", 2016, St. Cloud State University (Year: 2016).*

* cited by examiner

*Primary Examiner* — Hossain M Morshed
(74) *Attorney, Agent, or Firm* — Schwegman Lundberg & Woessner, P.A.

(57) ABSTRACT

Generally discussed herein are devices, systems, and methods for transparency and control in a user data migration process. A method can include displaying, by a display device, a user interface (UI) including a first display region including text indicating that a legacy application is being replaced by an upgraded application and that a user can select what data from the legacy application is ported over to the upgraded application, receiving, by the UI and from the user, data indicating what portion of data from the legacy application is to be ported over to the upgraded application, and porting over only the portion of the data from the legacy application indicated by the user.

20 Claims, 6 Drawing Sheets

FIG. 1

220 — APPLICATION X IS BEING UPGRADED AND WE WOULD LIKE TO KNOW WHAT DATA YOU WOULD LIKE ACCESSED BY THE UPGRADED APPLICATION

222 — WOULD YOU LIKE (AT LEAST SOME OF) YOUR CONFIGURATION AND SETTINGS TO BE THE SAME FOR THE UPGRADED APPLICATION?
228 — ☐ YES   230 — ☐ NO   236 — ⓘ MORE INFO.

224 — WOULD YOU LIKE (AT LEAST SOME OF) YOUR USER DATA FROM APPLICATION X TO BE USED BY THE UPGRADED APPLICATION?
232 — ☐ YES   234 — ☐ NO   238 — ⓘ MORE INFO.

226 — NONE OF YOUR AUTHENTICATION SECRETS WILL BE SHARED WITH THE UPGRADED APPLICATION, YOU WILL NEED TO CREATE/RE-ENTER AUTHENTICATION SECRETS FOR THE UPGRADED APPLICATION

SOFTWARE PRODUCT UPGRADE WITH TRANSPARENT DATA MIGRATION

BACKGROUND

Software upgrades are difficult for software providers. Users of a prior version of an application may not want to change to a newer version of the application. The users are not aware of what data was gathered by the prior version of the application, what data is being ported over to the new version of the application, or what data may remain stored for the prior version of the application.

SUMMARY

A device, system, method, and computer-readable medium configured for data porting transparency and control. A user, in switching from a legacy application to an upgraded application does not know what user data is provided for use by the upgraded application. The user is typically not aware of the extent and purpose of the user data, how the user data is used, or that the user data is provided for use by the upgraded application. In some cases, the user may not even be aware that the upgraded application and the original application are actually different entities.

Embodiments provide transparency and control to the user for a data migration process (data "porting" or "porting over") between the legacy application and the upgraded application. The data migration process is the operations of porting configuration and settings, the user data, or a combination thereof to a new location for reference by the upgraded application.

A method can include displaying, by a display device, a user interface (UI) including a first display region. The first display region can include text indicating that a legacy application is being replaced by an upgraded application. The first display region can indicate that a user can select what data from the legacy application is ported over to the upgraded application. The method can include receiving, by the UI and from the user, data indicating what portion of data from the legacy application is to be ported over to the upgraded application. The method can include porting over only the portion of the data from the legacy application indicated by the user.

The data from the legacy application can include separately selectable configuration and settings data. The configuration and settings data defines how, what, and under what circumstances the legacy application accesses user data and provides output to the user. The data from the legacy application can include separately selectable user data. The user data can be information gathered by the legacy application regarding user interaction with the legacy application and other related applications.

The method can further include prohibiting porting of authentication secrets from the legacy application to the upgraded application. The method can further include displaying, by a second UI, a progress icon indicating a status of the porting. The progress icon can indicate a source of the data from the legacy application, a destination of the data for the upgraded application, an amount of time remaining for the porting, or a combination thereof.

The method can further include identifying metadata indicating data structure differences between data of the legacy application and data of the upgraded application. The method can further include performing, based on the metadata, a data integrity check on the portion of the data indicated by the user. The method can further include displaying, by the UI, an indicator icon indicating a state of the data integrity check. The method can further include receiving, by the UI and from the user, data indicating what portion of data from the legacy application is to be deleted. The method can further include deleting only the data from the legacy application indicated by the user. A system, device, or computer-readable medium can be configured for performing the method.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Those who manage application operation "application management personnel" or just "personnel" can upgrade an application for security, functionality, aesthetic, or other reasons. A prior version of the application can be called a "legacy application" and the most recent version of the application can be called an "upgraded application". In altering the application, the personnel can change how user data is referenced, stored, operated on, managed, or the like by the upgraded application. The user, in switching to the upgraded application does not know what user data is provided for use by the upgraded application. The user is typically not aware of the extent and purpose of the user data, how the user data is used, or that the user data is provided for use by the upgraded application. In some cases, the user may not even be aware that the upgraded application and the original application are actually different entities.

Embodiments provide transparency and control to the user for a data migration process (data "porting" or "porting over") between the legacy application and the upgraded application. The data migration process is the operations of porting configuration and settings, the user data, or a combination thereof to a new location for reference by the upgraded application. The configuration and settings include data defining how, what, and under what circumstances the legacy application accesses user data and provides data to the user. The user data is information gathered by the legacy application regarding the user interaction with the legacy application.

The transparency and control can be provided by a user interface (UI). The UI can provide a wizard or other tool that allows the user to select what information of the configuration and settings and the user data is ported over to the upgraded application. Authentication secrets of the user can be prevented from being ported over to the upgraded application. Use of the upgraded application can force the user to choose a new username, password, other authentication secret, or a combination thereof. The sensitivity of the authentication secrets can be too high to transmit from one store to another. Further, the authentication secrets may have been compromised while being used for the application and forcing the user to provide the authentication secrets for the upgraded application can help keep the user information secure. Further yet, the authentication secrets may be generated using security protocols that are no longer considered best practices and requiring the user to provide the authentication secrets can force the use of improved computer security practices.

Embodiments inform a user as what data is collected by the legacy application. Embodiments allow the user to control what data of their configuration and settings and user data is ported over for reference by the upgraded application. Embodiments can help a user control security of and limit access to their user data.

Reference will now be made to the FIGS. to describe further details of embodiments. The FIGS. illustrate examples of embodiments and one or more components of one embodiment can be used with, or in place of, a component of a different embodiment.

Figure 1:
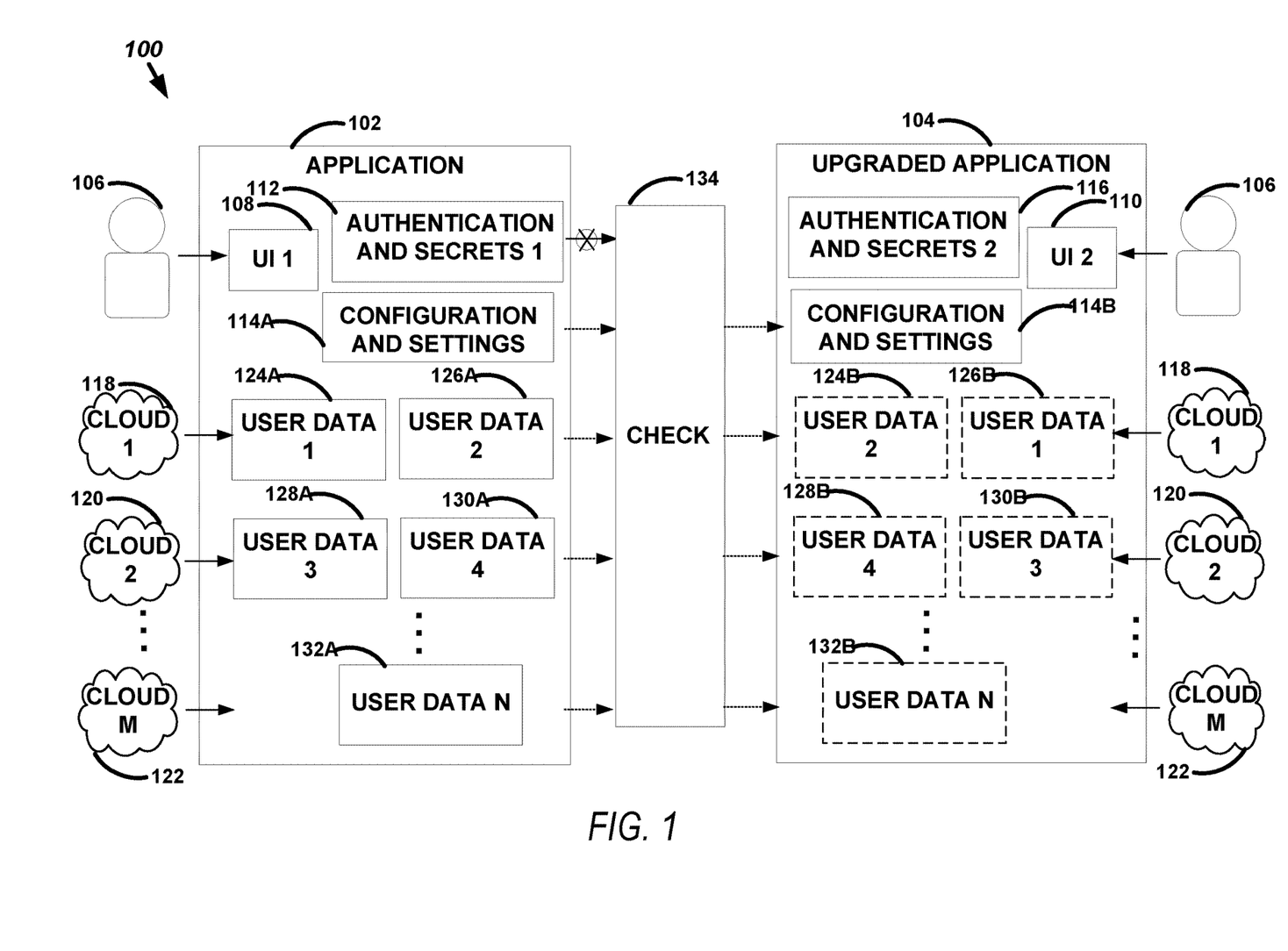
FIG. 1 illustrates, by way of example, a block diagram of an embodiment of a user-view of a system for software upgrade.

FIG. 1 illustrates, by way of example, a block diagram of an embodiment of a system 100 for software upgrade. The system 100 as illustrated includes a prior version of an application, a "legacy application" 102, an upgraded version of the application, an 'upgraded application" 104, a user 106, a data integrity checker 134, and one or more data sources 118, 120, 122 (illustrated as cloud sources in FIG. 1). The legacy application 102 is any software application that is managed by application management personnel and subject to being upgraded. Applications are upgraded for a wide variety of reasons. Such reasons can include fixing an operational bug, fixing a security vulnerability, updating a user interface (UI), adding functionality to the application, removing functionality from the application, altering functionality of the application to be more efficient, making the application compatible with a device, re-branding the application, changing where the application is hosted, a combination thereof, or the like. The upgraded application 104 is the legacy application 102 after the updates are applied thereto.

The user 106 interacts with the legacy application 102 through the UI 108. The UI 108 can be a graphical interface, audio interface, tactile interface, a combination thereof, or the like. The UI 108 allows the user 106 to access functionality of the legacy application 102. The UI 108 can include or be coupled to an application programming interface (API) that provides a communication interface between the UI 108 and the legacy application 102. The API is a software intermediary that allows two applications to communicate with each other (e.g., in this case the API can allow the UI 108 to communicate with the legacy application 102). The UI 108 is thus not necessarily part of the legacy application 102 but can be software separate from the legacy application 102.

The user 106, in setting up access to the legacy application 102, provides some information that they will use for identification purposes. This information is called authentication secrets 112. The legacy application 102, responsive to receiving valid authentication secrets 112, operates in accord with configuration and settings 114A that are default, user-specified, or a combination thereof. The authentication secrets 112 can include a username, password, token, biometric data (e.g., iris scan data, fingerprint data, facial feature data, or the like). The authentication secrets 112 are very sensitive information and typically protected by more security measures than other user data or relevant for use only on a specific device.

The configuration and settings 114A are specific to the legacy application 102. The configuration and settings 114A define how data is provided to the user 106 by the UI 108, what data is provided to the user 106 by the UI 108, whether the legacy application 102 provides a notification to the user and the circumstances in which the notifications are sent, whether the legacy application 102 can access the location of the user 106 through location services, whether updates to the legacy application 102 are downloaded automatically, manually, or the like, whether the legacy application 102 can share information about user activity with one or more other applications 102 (and which applications the legacy application 102 can share information with), whether legacy application 102 can import information (e.g., contacts, photos, call logs, text logs, or the like) from another application, what security measures are implemented to access the application, a combination thereof, or the like.

As the legacy application 102 executes, it collects user data 124A, 126A, 128A, 130A, and 132A. The user data 124A, 126A, 128A, 130A, and 132A is a record of the user 106 interaction with the legacy application 102. The user data 124A, 126A, 128A, 130A, and 132A can be quite extensive and consume a lot of memory space. The user data 124A, 126A, 128A, 130A, and 132A can be stored in the cloud 118, 120, 122. The user data 124A, 126A, 128A, 130A, and 132A can indicate what the user viewed, clicked on, entered, or otherwise interacted with using the legacy application 102. The user data 124A, 126A, 128A, 130A, and 132A, like the legacy application 102, has a wide variety of forms and functions, too many to be listed here. The user data 124A, 126A, 128A, 130A, and 132A is free from authentication secrets 112 and other sensitive information (e.g., credit card numbers, social security numbers, bank account information, medical information, or the like). The user data 124A, 126A, 128A, 130A, and 132A can be used to determine recommendations for the user 106. The recommendations can be included in the user data 124A, 126A, 128A, 130A, and 132A. The recommendations can be expressly provided by the user 106 but are more often inferred by activity of the user 106. The recommendations are predictions of preferences of the user 106 for a product or service.

The cloud 118, 120, 122 is illustrated as three clouds but represents multiple user data repositories. The cloud 118, 120, 122 indicates that the user data 124A, 126A, 128A, 130A, and 132A is stored remotely from a device the user 106 uses to access the legacy application 102. The cloud 118, 120, 122 stores data on the Internet to provide storage as a service. Cloud storage is typically purchased from a third-party cloud vendor who owns and operates data storage capacity and delivers the stored data over the Internet.

The vendor manages capacity, security, and durability. The legacy application 102 accesses the cloud 118, 120, 122 through a traditional protocol or via an API.

Personnel of the legacy application 102 (distinct from the user 106) can upgrade the legacy application 102 to result in an upgraded application 104. In changing the legacy application 102, the personnel can change how the user data 124A, 126A, 128A, 130A, and 132A is referenced, stored, operated on, managed, or the like. The user 106, in switching to the upgraded legacy application 102 does not know what, of the user data 124A, 126A, 128A, 130A, and 132A or configuration and settings 114A, or authentication secrets 112 is provided for use by the upgraded application 104. The user 106 is typically not aware of the extent and purpose of the user data 124A, 126A, 128A, 130A, 132A, how the user data 124A, 126A, 128A, 130A, 132A is used, or whether the user data 124A, 126A, 128A, 130A, 132A is provided for use by the upgraded application 104.

Embodiments provide transparency and control to the user for the process of migrating data from the legacy application 102 to the upgraded application 104. The data migration process is the operations of porting the configuration and settings 114A and even potentially at least some of the user data 124A, 126A, 128A, 130A, 132A over to the upgraded application 104. The transparency and control can be provided by a UI 108 or 110. The UI 108 or 110 can provide a wizard or other tool that allows the user 106 to select what information of the configuration and settings 114A and the user data 124A, 126A, 128A, 130A, 132A, if any, is ported over to the upgraded application 104. Note that ported over or migrating as used herein means that the data is stored verbatim or modified to a format compatible with the upgraded application 104 and then stored.

The authentication secrets 112 can be prevented from being ported over to the upgraded application 104. If the user wishes to retain the same authentication secrets 112 from the legacy application 102, new account creation may not be required. The upgraded application 104 can force the user 106 to choose a new username, password, re-enter an existing authentication secrets 112 to provide independent access to the user account in the upgraded application 104, other authentication secret, or a combination thereof. The sensitivity of the authentication secrets 112 can be too high to transmit from one store to another. The authentication secrets 112 may have been compromised while being used for the legacy application 102 and forcing the user 106 to provide the authentication secrets 116 for the upgraded application 104 can help keep the user information secure. The authentication secrets 112 may be generated using security protocols that are no longer considered best practices and requiring the user 106 to provide the authentication secrets 116 can force the use of improved computer security practices.

Preventing the authentication secrets 112 from porting over to the upgraded application 104 can include using a monitor to remove sensitive information from communications related to porting over data. Removing sensitive information can include scanning data to determine whether a regular expression pattern is present in the data. If the regular expression pattern is detected, the packet can be dropped, redacted, or otherwise prevented from conveying the sensitive information.

In some embodiments, the user 106 can choose to port over the configuration and settings 114A as the configuration and settings 114B. In some embodiments, the configuration and settings 114A can be ported over to the upgraded application 104 automatically (e.g., without user input) as the configuration settings 114B. In such embodiments, the user 106 can be informed that the configuration and settings 114A are being ported over. The user 106 can be informed of the nature and extent of the configuration and settings 114A. The user 106 can be informed how they can change the configuration and settings 114B in the upgraded application 104 in case the user 106 would like to change or does not like the configuration and settings 114B.

The user 106 can optionally cause none, some, or all of the user data 124A, 126A, 128A, 130A, 132A to be ported over to the upgraded application 104. The UI 108 can present the user 106 with data indicating what the user data 124A, 126A, 128A, 130A, 132A is and provide the user 106 with the option to port over the user data 124A, 126A, 128A, 130A, 132A or to not port over the user data 124A, 126A, 128A, 130A, 132A. The data indicating the content of the user data 124A, 126A, 128A, 130A, 132A can be presented in a human-readable form. The data indicating the content of the user data 124A, 126A, 128A, 130A, 132A can indicate a date the user data 124A, 126A, 128A, 130A, 132A was generated or recorded, a time the user data 124A, 126A, 128A, 130A, 132A was generated or recorded, a combination thereof or the like.

The UI 108 can present the data indicating the content of the user data 124A, 126A, 128A, 130A, 132A in categories, such as "usage history", "insights", "access metadata", "other", or the like. The usage history can detail dates/times of logon, navigation history (clicks, views, dwells, etc.), duration application was executing in a session, number of failed/successful logons, purchases, or the like. The insights can include product, service, or usage preferences for the user 106. The insights can be determined based on the usage history. The insights can be determined by a machine learning (ML) model or a similar model that compares usage history among users and determines the propensity for the users to prefer certain products, services, application configurations, or the like. Access metadata includes the device make, device model, operating system, internet protocol (IP) address, type of communication channel, a combination thereof, or the like that was used to access the application. Other is any other information that might be stored regarding the user, such as profile data, pictures, location information, or the like that is gathered by the legacy application 102.

The data integrity checker 134 can determine whether the data from the legacy application 102 is accurately ported over to the upgraded application 104. The data integrity checker 134 can compare the data from the legacy application 102 to the data ported over to the upgraded application 104. Such a comparison can include a cyclic redundancy check (CRC), or the like, on the data from the legacy application 102, comparison of a hash of at least a portion of the data from legacy application 102 compared to a hash of at least a portion of the data corresponding to the upgraded application 104, comparison of the data without hashing, double input of the data from the legacy application 102 to ensure data accuracy followed by deletion of one input of the data from the legacy application 102, among others.

The data integrity checker 134 can, additionally or alternatively, determine whether data that is to be deleted from the data sources 118, 120, 122 is actually deleted. The data integrity checker 134 can search the data sources 118, 120, 122 for a hash of the data to be deleted or the like to determine whether the data is deleted from the sources 118, 120, 122. The data integrity checker 134 can perform an action similar to the comparison discussed previously but with the desired result being a non-equal comparison, as compared to an equal comparison. The data integrity checker 134 can, responsive to determining the data is ported over accurately or the data is deleted, provide the user 106 with an indication (see FIG. 5 for an example indication) that the data is ported over, deleted, or a combination thereof. For example, an indicator icon can indicate that 'your data has been moved' integrity check that is handled (e.g., by an ML driven search) in the data source 118, 120, 122 for stings or known items from the data that provides a 'spot check' in the data sources 118, 120, 122 to ensure all the data has been deleted upon completion.

The legacy application 102 and the upgraded application 104 can have some data model differences. That is, the legacy application 102 and the upgraded application 104 can reference data in different formats, units, structures, a combination thereof, or the like. The data integrity checker 134 can understand this differences between the data model of the legacy application 102 and the data model of the upgraded application using metadata. The data integrity checker 134 can understand the data model differences based on the metadata and perform the data integrity check based on the metadata.

Figure 2:
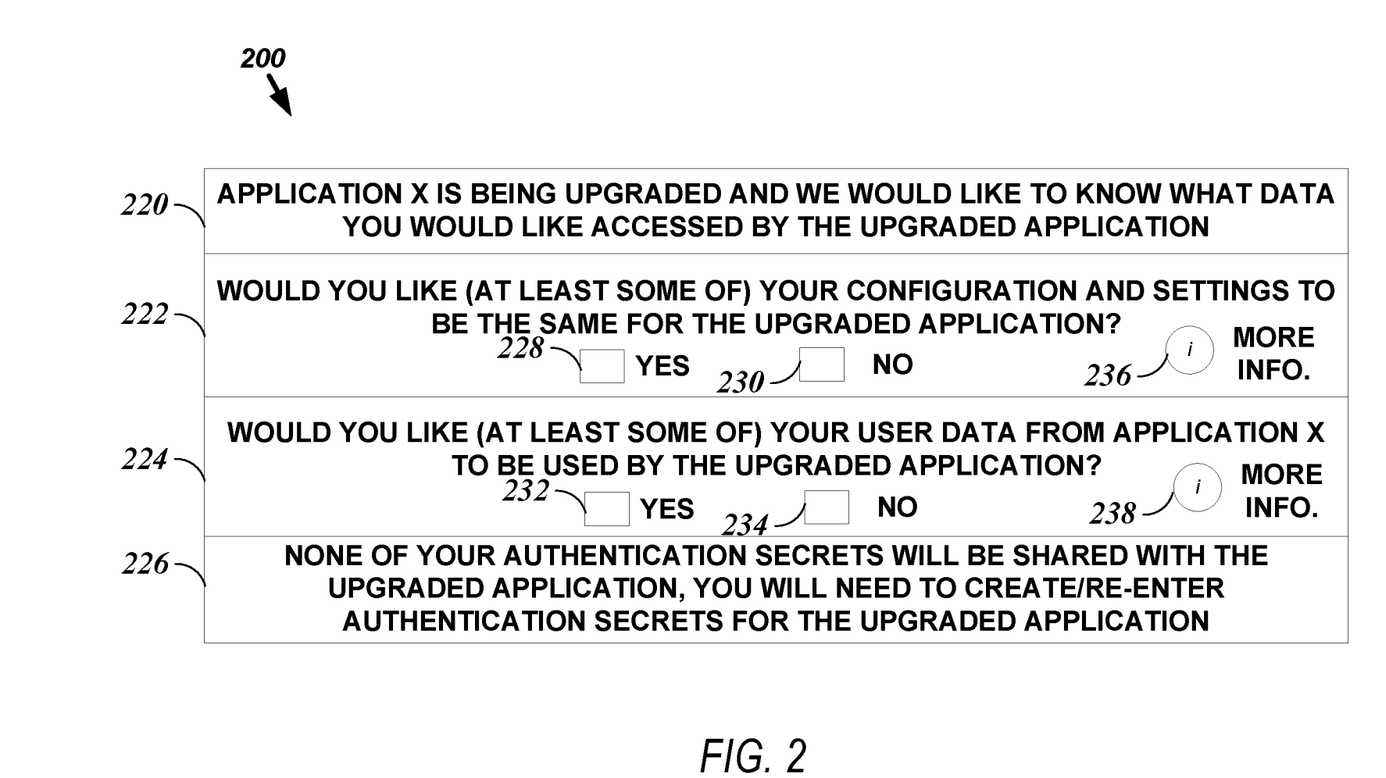
FIG. 2 illustrates, by way of example, a block diagram of an embodiment of a UI for transparency in data migration between applications.

FIG. 2 illustrates, by way of example, a block diagram of an embodiment of a UI 200 for transparency in data migration between applications. The UI 200 as illustrated includes multiple display regions. A first display region 220 includes a prompt that educates the user 106 that the legacy application 102 is being replaced by the upgraded application 104.

A second display region 222 includes a prompt that asks the user 106 if they would like their configuration and settings 114A to be ported over to the upgraded application 104 as the configuration and settings 114B. By selecting a "yes" software control 228, the user 106 can indicate that they desire to port over at least some of their configuration and settings 114A to the upgraded application 104. By selecting a "no" software control 230, the user 106 can indicate that they do not want the configuration and settings 114A ported over to the application 104. A more information software control 236, when selected, causes a pop-up box, another window, or the like, to appear that provides the user 106 with more details regarding what is in the configuration and settings 114A. For example, a box explaining "The configuration and settings include whether the application is allowed to access your contacts, photos, location services, operate using cellular data, how the interface appears, or whether face identification is enabled", or the like.

A third display region 224 includes a prompt that asks the user 106 if they would like their user data 124A, 126A, 128A, 130A, 132A to be ported over for use by the upgraded application 104. By selecting a "yes" software control 232, the user 106 can indicate that they desire to port over at least some of their user data 124A, 126A, 128A, 130A, 132A to the upgraded application 104. By selecting a "no" software control 234, the user 106 can indicate that they do not want the user data 124A, 126A, 128A, 130A, 132A ported over for use by the application 104. A more information software control 238, when selected, causes a pop-up box, another window, or the like, to appear that provides the user 106 with more details regarding what is in the user data 124A, 126A, 128A, 130A, 132A. For example, a box explaining "The user data includes usage history, insights, access metadata, among other data from the application", or the like. Embodiments, and the UI 200 are configured to enable the user 106 to transparently and granularly decide on a case-by-case basis what the data they wish to port to the new application 104. The UI 200 and other embodiments provide visual clarity of the data porting process. The UI 200 and other embodiments are designed to allow the user 106 to select the data to port over to the upgraded application 106 based on data types or classifications of the user data.

A fourth display region 226 includes a prompt that educates the user 106 that the authentication secrets that were used for the prior legacy application 102 will not be automatically ported over to the upgraded application 104. The fourth display region 226 can further explain that the user 106 can re-enter the authentication secrets 112 if they wish.

The software controls 228, 230, 236, 232, 234, 238 while illustrated as radio buttons and buttons can include text input boxes, one or more dropdown menus, sticky menus, scroll panels, card style selection interfaces, forms, steppers, switches, sliders, auto-fillers, a combination thereof, or the like. While the regions 220, 222, 224, 226 are displaced vertically from each other in FIG. 2, the regions 220, 222, 224, 226 can be displaced horizontally, vertically, or a combination thereof, from each other. Selecting the software controls 228, 230, 236, 232, 234, 238 can include physically selecting, such as by a mouse, touchscreen, touchpad, pen, stylus, or the like, audibly selecting, such as by a voice command, tactile selection, such as by a braille interface, or the like.

Figure 3:
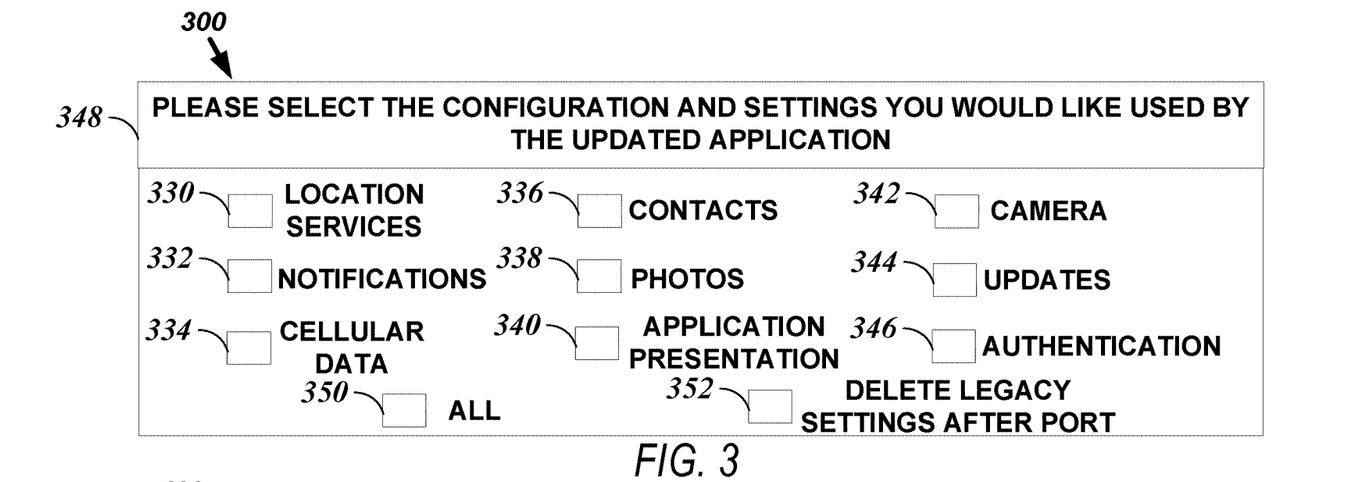
FIG. 3 illustrates, by way of example, a diagram of a UI for configuration and settings porting transparency.

FIG. 3 illustrates, by way of example, a diagram of a UI 300 for configuration and settings porting transparency. The UI 300 provides an explanation region 348 that indicates that the user 106 is in control of what configuration and settings 114A are ported over to the upgraded application 104. The UI 300 includes software controls 330, 332, 334, 336, 338, 340, 342, 344, 346, 350, 352. A state (whether the software control 330, 332, 334, 336, 338, 340, 342, 344, 346, 350, 352 is selected or unselected) indicates what configuration and settings 114A are ported over to the upgraded application 104 as the configuration and settings 114B.

The software control 330, when selected, indicates that locations services (whether the application can use the location of the user 106 and under what circumstances the application can use the location of the user 106) settings from the legacy application 102 are to be ported over to the application 104. The software control 330, when unselected, indicates that locations services settings from the legacy application 102 are not to be ported over to the application 104.

The software control 332, when selected, indicates that notifications settings (banners, sounds, badges, or the like regarding information received at the application or to be provided by the application) from the legacy application 102 are to be ported over to the application 104. The software control 332, when unselected, indicates that notifications settings from the legacy application 102 are not to be ported over to the application 104. An advantage of the UI 200, 300, or other UI, is that they clearly and transparently allow the user to select what they will port over to the upgraded application 104. A UI 500 (see FIG. 5) shows a state of the porting of the user data 106 between applications 102 and 104.

The software control 334, when selected, indicates that cellular data settings (whether the application can operate using cellular data and under what circumstances the application can operate using cellular data) from the legacy application 102 are to be ported over to the application 104. The software control 332, when unselected, indicates that cellular data settings from the legacy application 102 are not to be ported over to the application 104.

The software control 336, when selected, indicates that contacts (name and corresponding correspondence information such as phone number, email address, address, notes, or the like) accessible by the legacy application 102 are to be ported over to the application 104. The software control 332, when unselected, indicates that contacts information from the legacy application 102 are not to be ported over to the application 104.

The software control 338, when selected, indicates that photos (or other output from a camera of a user device or stored on the user device) accessible by the legacy application 102 are to be ported over to the application 104. The software control 338, when unselected, indicates that photos settings from the legacy application 102 are not to be ported over to the application 104.

The software control 340, when selected, indicates that application presentation settings (information displayed, information layout, execution parameters, or the like) from the legacy application 102 are to be ported over to the application 104. The software control 340, when unselected, indicates that application presentation settings from the legacy application 102 are not to be ported over to the application 104.

The software control 342, when selected, indicates that camera settings (whether the application can access a camera of a user device and under what circumstances the application can access the camera of the user device) from the legacy application 102 are to be ported over to the application 104. The software control 342, when unselected, indicates that camera settings from the legacy application 102 are not to be ported over to the application 104.

The software control 344, when selected, indicates that update settings (whether the application is updated automatically or manually and when the update occurs) from the legacy application 102 are to be ported over to the application 104. The software control 344, when unselected, indicates that update settings from the legacy application 102 are not to be ported over to the application 104.

The software control 346, when selected, indicates that authentication settings (whether two-factor authentication is used, face identification as authentication is allowed, or the like) from the legacy application 102 are to be ported over to the application 104. Note this control is distinct from sharing the secrets as the control 346 controls which secrets are valid authentication secrets and does not divulge or affect the secrets themselves. The software control 346, when unselected, indicates that authentication settings from the legacy application 102 are not to be ported over to the application 104.

The software control 350, when selected, causes all of the software controls 330, 332, 334, 336, 338, 340, 342, 344, 346 to be put in a selected state. If the software control 350 is unselected after being selected, any of the software controls 330, 332, 334, 336, 338, 340, 342, 344, 346 that were not actively selected by the user 106 can be place in an unselected state. Active selection means that the user performed an action other than selecting the software control 350 that caused the software control to be in an active state. If the software control 350 is selected and then user 106 selects one of the software controls 330, 332, 334, 336, 338, 340, 342, 344, 346 to cause the software control 330, 332, 334, 336, 338, 340, 342, 344, 346 to be in an unselected state, the software control 350 can automatically (without human interference) revert to an unselected state.

The software control 352, when selected, indicates that the configuration and settings 114A are to be deleted from the sources of data 118, 120, 122 for the legacy application 102 after any selected configuration and settings 114A from the UI 300 are ported over to the upgraded application 104. The software control 352, when unselected, indicates that the configuration and settings 114A are to remain in the sources of data 118, 120, 122 for the legacy application 102. The software control 352 provides the user 106 with more control over where their data resides and what applications 102, 104 have access to their configuration and settings 114A data.

Figure 4:
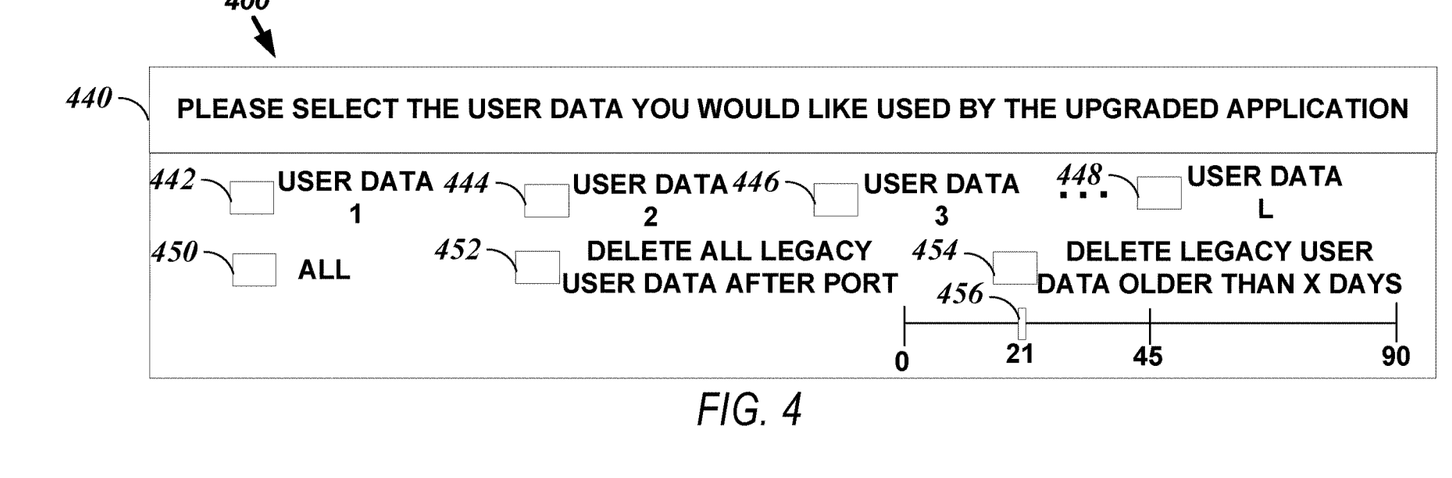
FIG. 4 illustrates, by way of example, a diagram of a UI for user data porting transparency.

FIG. 4 illustrates, by way of example, a diagram of a UI 400 for user data porting transparency. The UI 400 provides an explanation region 440 that indicates that the user 106 is in control of what user data 124A, 126A, 128A, 130A, 132A ported over to the upgraded application 104. The UI 400 includes software controls 442, 444, 446, 448, 450, 452, 454, 456. A state (whether the software control 440, 442, 444, 446, 448 is selected or unselected) of the software control 440, 442, 444, 446, 448 indicates what user data 124A, 126A, 128A, 130A, 132A is ported over to the upgraded application 104 as the user data 124B, 126B, 128B, 130B, 132B. A state of the software control 452, 454 indicates whether all the user data 124A, 126A, 128A, 130A, 132A accessible by the legacy application 102 is deleted after porting over to the upgraded application 104. The software control 456 indicates a number of most recent days of user data 124A, 126A, 128A, 130A, 132A that are ported over to the upgraded application 104.

The software control 442, when selected, indicates that user data 1 124A accessible by the legacy application 102 is to be ported over to the application 104. The software control 442, when unselected, indicates that the user data 124A accessible by the legacy application 102 is not to be ported over to the application 104. The state of the software controls 444, 446, 448 further controls what of the user data 126A, 128A, 130A, 132A is ported over to the upgraded application 104 as the user data 126B, 128B, 130B, 132B. Note the user data 124A, 126A, 128A, 130A, 132A can be individual instances of user data, categories of user data, time-related instances of user data (e.g., user data from a specified range of dates), or the like.

The software control 450, when selected, causes all of the software controls 442, 444, 446, 448 to be put in a selected state. If the software control 450 is unselected after being selected, any of the software controls 442, 444, 446, 448 that were not actively selected by the user 106 can be place in an unselected state. Active selection means that the user performed an action other than selecting the software control 450 that caused the software control to be in an active state. If the software control 450 is selected and then user 106 selects one of the software controls 442, 444, 446, 448 to cause the software control 442, 444, 446, 448 to be in an unselected state, the software control 450 can automatically revert to an unselected state.

The software control 452, when selected, indicates that all the user data 124A, 126A, 128A, 130A, 132A is to be deleted from the sources of data 118, 120, 122 for the legacy application 102 after any selected user data 124A, 126A, 128A, 130A, 132A from the UI 400 is ported over to the upgraded application 104. The software control 452, when unselected, indicates that the user data 124A, 126A, 128A, 130A, 132A is to remain in the sources of data 118, 120, 122 for the legacy application 102. The software control 452 provides the user 106 with more control over where their data resides and what applications 102, 104 have access to their user data 124A, 126A, 128A, 130A, 132A.

The software control 454, when selected, indicates that the user data 124A, 126A, 128A, 130A, 132A older than a user specified number of days is to be deleted from the sources of data 118, 120, 122 for the legacy application 102 after any selected user data 124A, 126A, 128A, 130A, 132A from the UI 400 is ported over to the upgraded application 104. The software control 454, when unselected, indicates that the user 106 is opting to use the software control 452 to manage user data retention. The software control 456 is a slider bar that the user 106 can select and slide to a specified number of days. In the example of FIG. 4, the software control 456 is at 21 days, which means that any of the user data 124A, 126A, 128A, 130A, 132A that is older than 21 days will be deleted after, and if, it is ported over to the upgraded application 104. For compliance reasons, some user data migration may be limited by law to be a specified number of days back from a current date. For example, a General Data Protection Regulation (GDPR) in force in the European Union limits user data to the last 90 days. The UI 400 can include an icon indicating if (even why) the user selection on the software control 456 is possible.

While the software controls 352, 452 are illustrated as "all or nothing" sorts of controls, in some embodiments, the user 106 can select with more granularity which data of the configuration and settings 114A and the user data 124A, 126A, 128A, 130A, 132A are deleted after optionally porting data over to the upgraded application 104. For example, a same number of software controls that can be selected for porting over data can be presented for deleting data from the legacy application 102 thus providing the user 106 with even more control over the location and existence of their data.

While the user 106 can control what data is being ported over to the upgraded application 104 using the UIs 200, 300, 400, the user 106 may not be confident that some of their data is not provided and that the data they selected to port over is provided to the upgraded application. To help the user 106 gain confidence that their data is being ported over consistent with their selections and that no data that they do not want ported over to the upgraded application 104 is provided for access by the upgraded application 104, a UI 500 (see FIG. 5) summarizing the data porting can be provided.

Figure 5:
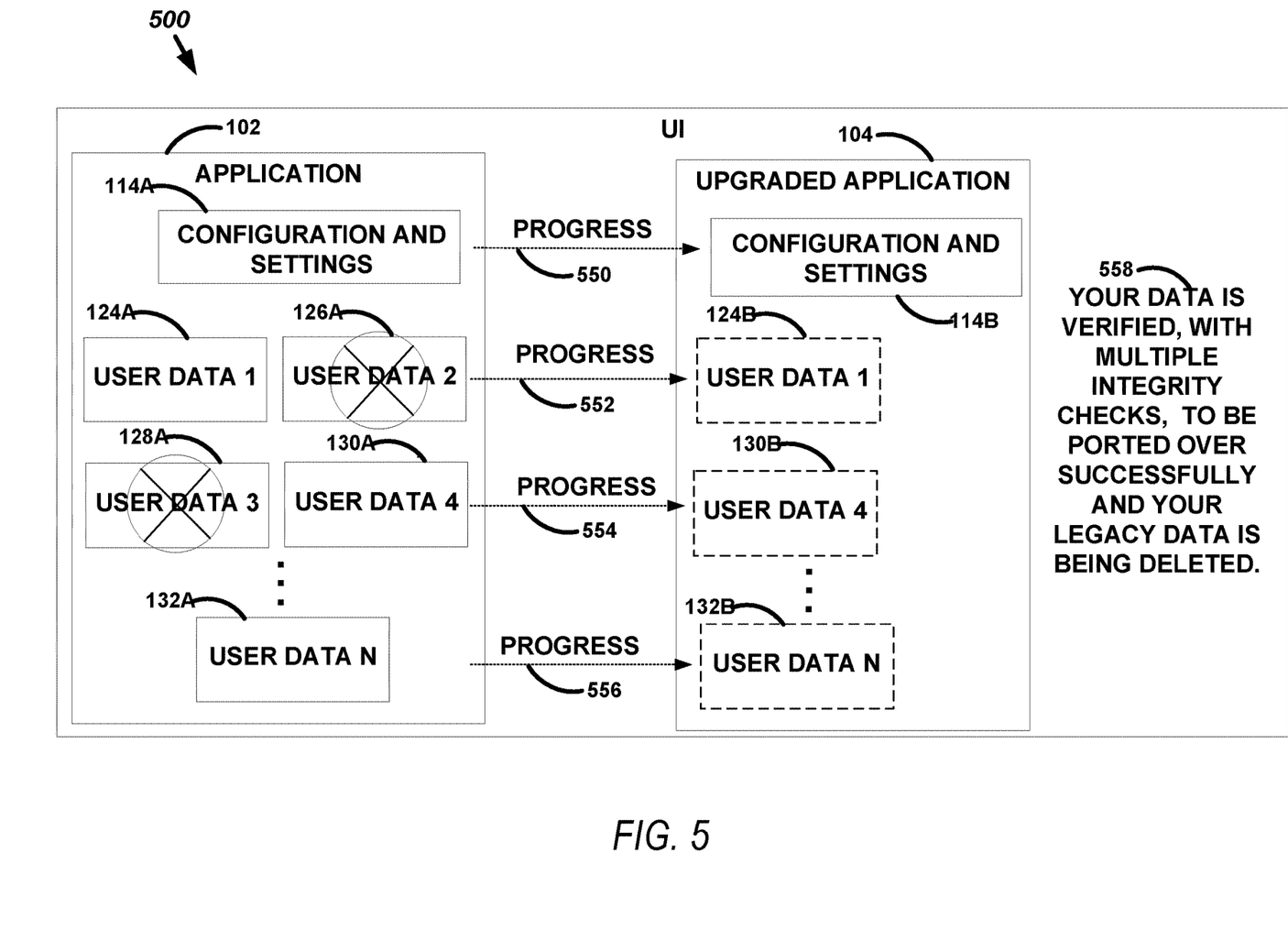
FIG. 5 illustrates, by way of example, a diagram of an embodiment of a UI for data porting transparency.

FIG. 5 illustrates, by way of example, a diagram of an embodiment of a UI 500 for data porting transparency. The UI 500 as illustrated includes icons indicating the configuration and settings 114A and the user data 124A, 126A, 128A, 130A, 132A. An icon with a circumscribed "X" over it indicates that data is not being ported over for use by the updated application 104. In the example of FIG. 5, software controls associated with the user data 126A and the user data 128A are unselected by the user 106 and the software controls associated with the user data 124A, 130A, 132A are selected by the user. In the example of FIG. 5, all of the items of the configuration and settings 114A are selected for porting over to the upgraded application 104.

The UI 500 further includes progress indicator icons 550, 552, 554, 556. The progress indicator icons 550, 552, 554, 556 provide an animation, text, image, a combination thereof, or the like that provides the user 106 with a status indication of the status of legacy application 102 porting over progress. The status indication can include a source of the data (e.g., a cloud or user device), a destination of the data (e.g., a cloud), estimated time remaining for completing the data transfer, estimated amount of data left to port over, a combination thereof, or the like.

The UI 500 further includes a state indicator icon 558. The state indicator icon 558 indicates, to the user 106, a state of the data portion, data deletion, or a combination thereof. The state indicator icon 558 can indicate that data porting is in progress, how much data porting has been performed, how much data porting is left to be performed, whether data integrity was performed in data porting, whether data porting passed data integrity checks, whether data is deleted from the data sources 118, 120, 122, that data deletion is in progress, how much data deletion has been performed, how much data deletion is left to be performed, a combination thereof, or the like.

Figure 6:
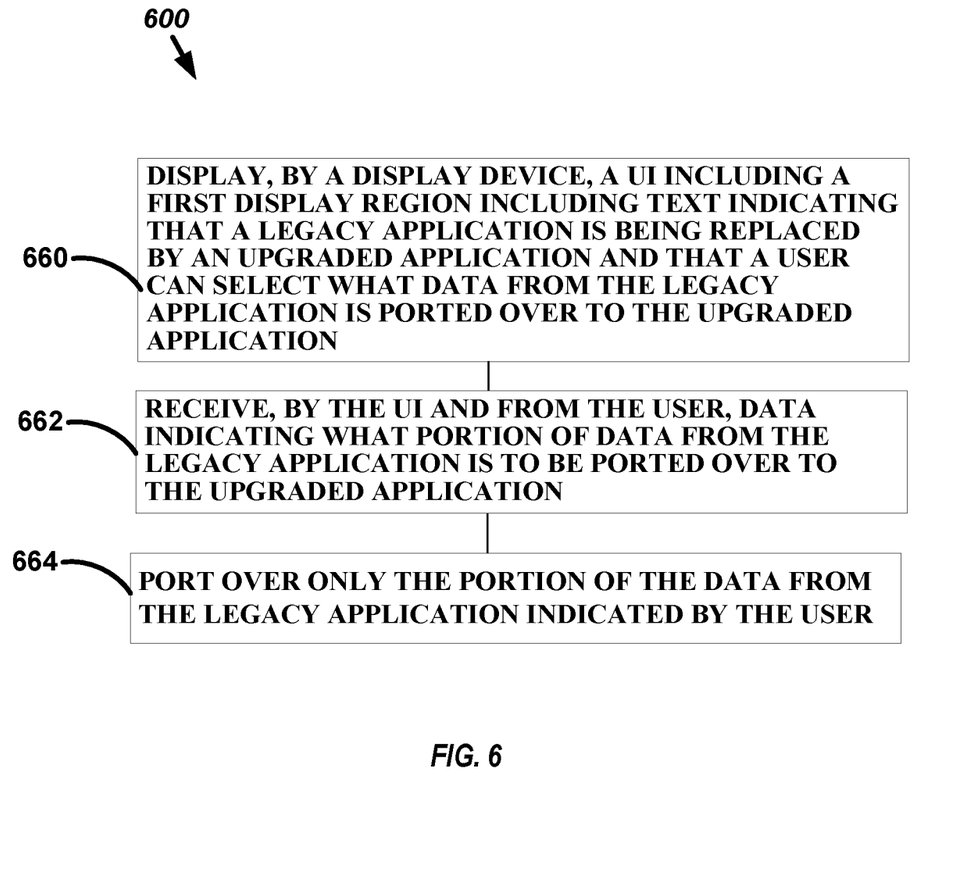
FIG. 6 illustrates, by way of example, a diagram of an embodiment of a method for data porting transparency and control.

FIG. 6 illustrates, by way of example, a diagram of an embodiment of a method 600 for data porting transparency and control. The method 600 as illustrated includes displaying, by a display device, a user interface (UI) including a first display region including text indicating that a legacy application is being replaced by an upgraded application and that a user can select what data from the legacy application is ported over to the upgraded application, at operation 660; receiving, by the UI and from the user, data indicating what portion of data from the legacy application is to be ported over to the upgraded application, at operation 662; and porting over only the portion of the data from the legacy application indicated by the user, at operation 664.

The data from the legacy application can include separately selectable configuration and settings data. The configuration and settings data defines how, what, and under what circumstances the legacy application accesses user data and provides output to the user. The data from the legacy application can include separately selectable user data. The user data can be information gathered by the legacy application regarding user interaction with the legacy application and other related applications.

The method 600 can further include prohibiting porting of authentication secrets from the legacy application to the upgraded application. The method 600 can further include displaying, by a second UI, a progress icon indicating a status of the porting. The progress icon can indicate a source of the data from the legacy application, a destination of the data for the upgraded application, and an amount of time remaining for the porting.

The method 600 can further include identifying metadata indicating data structure differences between data of the legacy application and data of the upgraded application. The method 600 can further include performing, based on the metadata, a data integrity check on the portion of the data indicated by the user. The method 600 can further include displaying, by the UI, an indicator icon indicating a state of the data integrity check. The method 600 can further include receiving, by the UI and from the user, data indicating what portion of data from the legacy application is to be deleted. The method 600 can further include deleting only the data from the legacy application indicated by the user.

Figure 7:
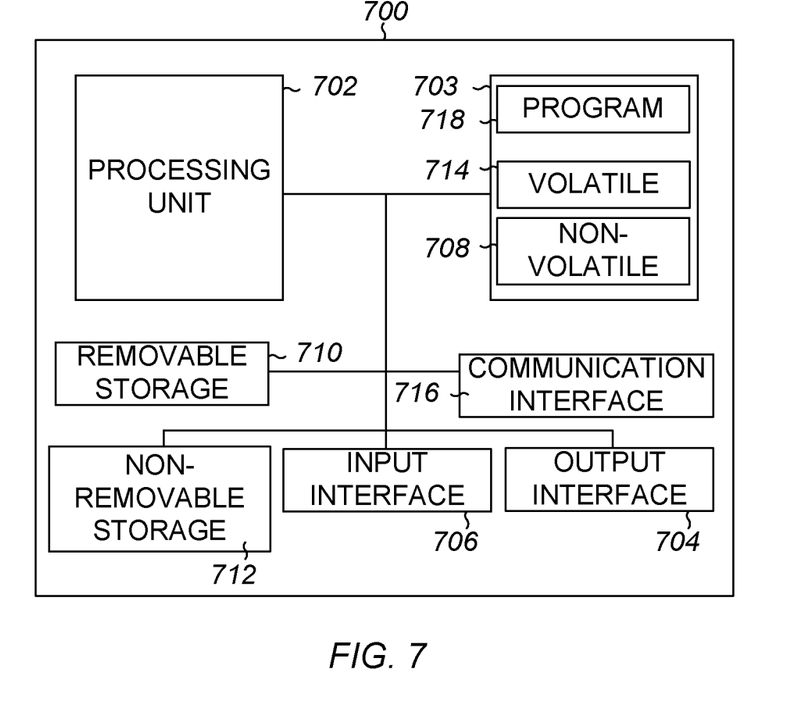
FIG. 7 illustrates, by way of example, a block diagram of an embodiment of a machine (e.g., a computer system) to implement one or more embodiments.

FIG. 7 illustrates, by way of example, a block diagram of an embodiment of a machine 700 (e.g., a computer system) to implement one or more embodiments. One or more of the legacy application 102, upgraded application 104, data integrity checker 134, UI 108, UI 110, UI 200, UI 300, UI 400, UI 500, method 600 or a component or operations thereof can be implemented, at least in part, using a component of the machine 700. One example machine 700 (in the form of a computer), may include a processing unit 702, memory 703, removable storage 710, and non-removable storage 712. Although the example computing device is illustrated and described as machine 700, the computing device may be in different forms in different embodiments.

For example, the computing device may instead be a smartphone, a tablet, smartwatch, or other computing device including the same or similar elements as illustrated and described regarding FIG. 7. Devices such as smartphones, tablets, and smartwatches are generally collectively referred to as mobile devices. Further, although the various data storage elements are illustrated as part of the machine 700, the storage may also or alternatively include cloud-based storage accessible via a network, such as the Internet.

Memory 703 may include volatile memory 714 and non-volatile memory 708. The machine 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 700 may include or have access to a computing environment that includes input 706, output 704, and a communication connection 716. Output 704 may include a display device, such as a touchscreen, that also may serve as an input component. The input 706 may include one or more of a touchscreen, touchpad, mouse, keyboard, camera, one or more device-specific buttons, one or more sensors integrated within or coupled via wired or wireless data connections to the machine 700, and other input components. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 702 (sometimes called processing circuitry) of the machine 700. A hard drive, CD-ROM, and RAM are some examples of articles including a non-transitory computer-readable medium such as a storage device. For example, a computer program 718 may be used to cause processing unit 702 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on processing circuitry, such as can include a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The processing circuitry can, additionally or alternatively, include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like). The terms computer-readable medium, machine readable medium, and storage device do not include carrier waves or signals to the extent carrier waves and signals are deemed too transitory.

Additional Notes and Examples

Example 1 includes a system comprising processing circuitry, and a memory including instructions that, when executed by the processing circuitry, cause the processing circuitry to perform operations for data porting transparency and control, the operations comprising displaying, by the display device, a user interface (UI) including a first display region including text indicating that a legacy application is being replaced by an upgraded application and that a user can select what data from the legacy application is ported over to the upgraded application, receiving, by the UI and from the user, data indicating what portion of data from the legacy application is to be ported over to the upgraded application, and porting over only the portion of the data from the legacy application indicated by the user.

In Example 2, Example 1 further includes, wherein the data from the legacy application includes separately selectable configuration and settings data, the configuration and settings data defines how, what, and under what circumstances the legacy application accesses user data and provides output to the user.

In Example 3, Example 2 further includes, wherein the data from the legacy application includes separately selectable user data, the user data is information gathered by the legacy application regarding user interaction with the legacy application and other related applications.

In Example 4, Example 3 further includes, wherein the operations further comprise prohibiting porting of authentication secrets from the legacy application to the upgraded application.

In Example 5, at least one of Examples 1-4 further includes, wherein the operations further comprise displaying, by a second UI, a progress icon indicating a status of the porting.

In Example 6, Example 5 further includes, wherein the progress icon indicates a source of the data from the legacy application, a destination of the data for the upgraded application, and an amount of time remaining for the porting.

In Example 7, at least one of Examples 1-6 further includes identifying metadata indicating data structure differences between data of the legacy application and data of the upgraded application, performing, based on the metadata, a data integrity check on the portion of the data indicated by the user, and displaying, by the UI, an indicator icon indicating a state of the data integrity check.

In Example 8, at least one of Examples 1-7 further includes receiving, by the UI and from the user, data indicating what portion of data from the legacy application is to be deleted and deleting over only the data from the legacy application that is to be deleted.

In Example 9, Example 8 further includes, wherein the data indicating the portion of data from the legacy application to be deleted included receiving, by the UI and from the user, a number of days of user data to retain and deleting only the user that is not to be retained.

Example 10 includes a method to perform the operations of the processing circuitry of at least one of Examples 1-9.

Example 11 includes a machine-readable medium including instructions that, when executed by a machine, cause the machine to perform operations of the method of Example 10.

Although a few embodiments have been described in detail above, other modifications are possible. For example, the logic flows depicted in the figures do not require the order shown, or sequential order, to achieve desirable results. The desirable for embodiments can include the user having confidence in the state of their data, settings, controls, and secrets before, during, and after a migration to a new version of an application. Using multiple factors to check data state, integrity, presence, and absence before and after the migration can increase confidence. Other steps may be provided, or steps may be eliminated, from the described flows, and other components may be added to, or removed from, the described systems. Other embodiments may be within the scope of the following claims.

What is claimed is:

1. A system comprising:
   processing circuitry;
   a display device coupled to the processing circuitry;
   a memory coupled to the processing circuitry the memory including instructions that, when executed by the processing circuitry, cause the processing circuitry to perform operations for data porting transparency and control, the operations comprising:
      displaying, by the display device, a user interface (UI) including a first display region including text indicating that a legacy application is being replaced by an upgraded application and that a user can select what data from the legacy application is ported over to the upgraded application;
      receiving, by the UI and from the user, data indicating what portion of data from the legacy application is to be ported over to the upgraded application; and
      porting over only the portion of the data from the legacy application indicated by the user.

2. The system of claim 1, wherein the data from the legacy application includes separately selectable configuration and settings data, the configuration and settings data defines how, what, and under what circumstances the legacy application accesses user data and provides output to the user.

3. The system of claim 2, wherein the data from the legacy application includes separately selectable user data, the user data is information gathered by the legacy application regarding user interaction with the legacy application and other related applications.

4. The system of claim 3, wherein the operations further comprise prohibiting porting of authentication secrets from the legacy application to the upgraded application.

5. The system of claim 1, wherein the operations further comprise displaying, by a second UI, a progress icon indicating a status of the porting.

6. The system of claim 5, wherein the progress icon indicates a source of the data from the legacy application, a destination of the data for the upgraded application, and an amount of time remaining for the porting.

7. The system of claim 1, wherein the operations further comprise:
   identifying metadata indicating data structure differences between data of the legacy application and data of the upgraded application;
   performing, based on the metadata, a data integrity check on the portion of the data indicated by the user; and
   displaying, by the UI, an indicator icon indicating a state of the data integrity check.

8. The system of claim 1, wherein the operations further comprise:
   receiving, by the UI and from the user, data indicating what portion of data from the legacy application is to be deleted; and
   deleting only the data from the legacy application that is indicated to be deleted.

9. The system of claim 8, wherein the data indicating the portion of data from the legacy application to be deleted included receiving, by the UI and from the user, a number of days of user data to retain and deleting only the user that is not to be retained.

10. A method comprising:
    displaying, by a display device, a user interface (UI) including a first display region including text indicating that a legacy application is being replaced by an upgraded application and that a user can select what data from the legacy application is ported over to the upgraded application;
    receiving, by the UI and from the user, data indicating what portion of data from the legacy application is to be ported over to the upgraded application; and
    porting over only the portion of the data from the legacy application indicated by the user.

11. The method of claim 10, wherein the data from the legacy application includes separately selectable configuration and settings data, the configuration and settings data defines how, what, and under what circumstances the legacy application accesses user data and provides output to the user.

12. The method of claim 11, wherein the data from the legacy application includes separately selectable user data, the user data is information gathered by the legacy application regarding user interaction with the legacy application and other related applications.

13. The method of claim 12, further comprising prohibiting porting of authentication secrets from the legacy application to the upgraded application.

14. The method of claim 10, further comprising displaying, by a second UI, a progress icon indicating a status of the porting.

15. The method of claim 14, wherein the progress icon indicates a source of the data from the legacy application, a destination of the data for the upgraded application, and an amount of time remaining for the porting.

16. The method of claim 10, further comprising:
    identifying metadata indicating data structure differences between data of the legacy application and data of the upgraded application;
    performing, based on the metadata, a data integrity check on the portion of the data indicated by the user; and
    displaying, by the UI, an indicator icon indicating a state of the data integrity check.

17. The method of claim 10, further comprising:
    receiving, by the UI and from the user, data indicating what portion of data from the legacy application is to be deleted; and deleting only the data from the legacy application that is indicated by the user to be deleted.

18. A machine-readable medium including instructions that, when executed by a machine, cause the machine to perform operations comprising:
- displaying, by a display device, a user interface (UI) including a first display region including text indicating that a legacy application is being replaced by an upgraded application and that a user can select what data from the legacy application is ported over to the upgraded application;
- receiving, by the UI and from the user, data indicating what portion of data from the legacy application is to be ported over to the upgraded application; and
- porting over only the portion of the data from the legacy application indicated by the user.

19. The machine-readable medium of claim 18, wherein the data from the legacy application includes separately selectable configuration and settings data, the configuration and settings data defines how, what, and under what circumstances the legacy application accesses user data and provides output to the user.

20. The machine-readable medium of claim 19, wherein the data from the legacy application includes separately selectable user data, the user data is information gathered by the legacy application regarding user interaction with the legacy application and other related applications.

* * * * *